UNITED STATES PATENT OFFICE.

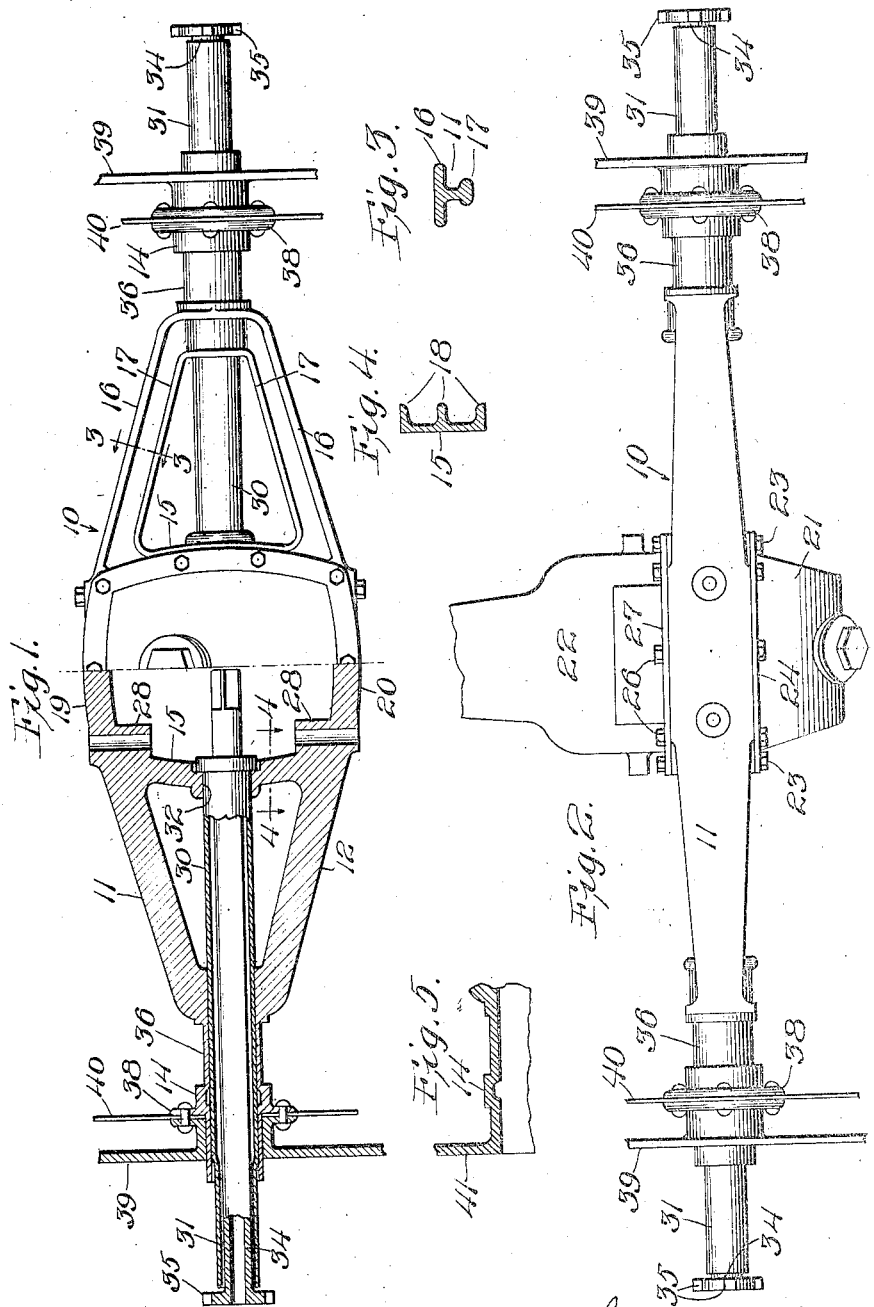

THOMAS I. DUFFY, OF CHICAGO, ILLINOIS, ASSIGNOR TO HENRY ELLSWORTH AND ALBERT E. CROSS, BOTH OF CHICAGO, ILLINOIS, COPARTNERS DOING BUSINESS UNDER THE FIRM-NAME OF ELLSWORTH & CROSS.

AXLE FOR MOTOR-VEHICLES.

1,076,559.  Specification of Letters Patent.  Patented Oct. 21, 1913.

Application filed June 5, 1912. Serial No. 701,722.

*To all whom it may concern:*

Be it known that I, THOMAS I. DUFFY, a citizen of the United States, and a resident of Chicago, in the county of Cook and State of Illinois, have invented certain new and useful Improvements in Axles for Motor-Vehicles; and I do hereby declare that the following is a full, clear, and exact description thereof, reference being had to the accompanying drawings, and to the characters of reference marked thereon, which form a part of this specification.

This invention relates to improvements in axles for motor vehicles, and refers more particularly to an improved rear axle construction which is associated with the driving mechanism for the rear or traction wheels of such a vehicle.

Among the objects of the invention is to provide an exceedingly strong and rigid axle construction which is made principally of a single piece, and with the parts thereof which are separately formed fixed together as rigidly as the parts of a one piece axle, and, further to provide an axle structure of this character which is light, as compared to its strength, and which requires but little machining in its construction and assemblage.

The invention consists in the arrangement and combination of the parts hereinafter described and more particularly pointed out in the appended claims.

In the drawings, Figure 1 is a view partially in rear elevation and partially in axial section of an axle embodying my invention. Fig. 2 is a plan view thereof. Fig. 3 is a cross section on the line 3—3 of Fig. 1. Fig. 4 is a cross section on the line 4—4 of Fig. 1. Fig. 5 is a detail sectional view, hereinafter described, showing a modification.

As shown in the drawings, 10 designates the body of the axle which is made of a single cast or forged metal part. The axle body comprises an upper arched truss member 11 and a lower reversed arched truss member 12, and said truss members are widely separated at the longitudinal center of the axle and converge outwardly and merge into elongated bearing sleeves 14, 14 near the ends of the axle.

15, 15 designate strut members which extend between and are made integral with the truss members, said strut members being located at the sides of the longitudinal center of the axle. The said truss members 11, 12 are preferably provided at their outer edges with relatively deep flanges 16 and at their inner edges with narrower flanges 17, giving to the cross section of the truss members a general T-shape. These flanges are carried outwardly over the inner ends of the sleeves 14. The said strut members 15 are also provided with stiffening flanges 18, as shown in Fig. 4. The said strut members 15 are shown as curved outwardly between their ends and they constitute, in connection with the central portions 19, 20 of the upper and lower truss members, respectively, a portion of a chamber to receive the differential gear which is associated with said axle, in the same manner as illustrated in my co-pending application, filed of even date, for U. S. Letters Patent, Serial No. 701,723. The casing for said gear comprises in addition to the rear cap plate 21, a front casing 22. The rear cap plate is attached to the rear side of the axle in any suitable manner, as by the bolts 23, said bolts extending through the marginal flanges 24 of the cap plate and into said strut members and the central portions 19, 20 of the truss members. The casing 22 which incloses that part of the differential gear in front of the axle is attached to the strut members and central portions of the truss members by the screw bolts 26 that extend through the flange 27 at the rear end of the casing and into said strut and truss members. Said casing 25 is adapted to receive at its forward end the rear end of the torque tube which contains the motor driven propeller shaft of the transmission mechanism, not shown. The said central portions of the strut members are provided with hollow lugs or bosses 28 through which are adapted to extend the bolts by which the differential gear mounting or frame is attached to the axle within the chambered portion described.

30, 30 designate tubes which are formed at their outer ends, beyond the sleeves 14, to constitute spindles 31 of the axle, and said tubes extend through and have close bearing in said sleeves 14 and in openings 32 formed in the thickened parts of the central portions of the strut members 15. The said tubes are forced into their bearings in the axle body under hydraulic pressure and constitute, when assembled in the axle, a rigid and a permanent part of the axle structure. These tubes are preferably drawn seamless tubes and they are reduced at their outer ends, beyond the sleeves 14, to constitute the spindles 31 in the manner shown in Fig. 1. The said tubes 30 at each side of the longitudinal center of the axle are disposed in axial alinement with each other and with the center of the differential gear mechanism, not shown. The said axle tubes receive the shafts 34, arranged one at each side of the longitudinal center of the axle, which shafts are adapted to be connected at their inner ends to the differential gear mechanism, being squared for engagement with the differential gear elements, and they extend at their outer ends beyond the spindles and are provided at their outer ends with the usual dogs 35 by which to afford driving connection between said shafts and the hubs which are adapted to be mounted on said spindles. The said sleeves 14 of the axle body are preferably reduced at 36 to receive spring seats, not shown. The sleeves may be provided beyond said reduced portions 36 with flanges 38 to which to rivet the torque arms 39 of the brake mechanism, not shown, and also the plates 40 which are adapted in the complete assembled structure of an axle, to close the inner ends of the brake drums, not shown. If desired, the torque arms may be made integral with said sleeves, as shown at 41 in Fig. 5; and in this event the covers for the brake drum will be differently applied.

It is obvious from the foregoing, that I have provided an axle structure of great strength which may be economically made and which is relatively light as compared with its strength. A further advantage of the axle is that it is made of but few parts so as to thereby avoid liability of racking of the axle, or the parts thereof becoming dismembered. The parts of which the axle is made require but little machining, thereby making the axle very economical.

I claim as my invention:—

1. A vehicle axle comprising an open work, diamond shaped body, embracing upper and lower members which are separated most widely at their central portions and the ends of which terminate in sleeves, the intermediate portions of said upper and lower members being joined by integral members constituting the side walls of a gear housing, said side walls being provided with openings, and tubular members fitting tightly at their inner ends in said openings of the side walls and fitting tightly at their outer ends in said sleeves.

2. A vehicle axle comprising an open work, diamond shaped body, embracing upper and lower members which are separated most widely at their central portions and the ends of which terminate in sleeves, the intermediate portions of said upper and lower members being joined by integral members constituting the two side walls of a gear housing, said side walls being provided with openings, and tubular members fitting tightly at their inner ends in said openings of the side walls and fitting tightly at their outer ends in said sleeves and extending beyond said sleeves to constitute spindles for the wheel hubs of the vehicle.

3. A vehicle axle comprising an open work, diamond shaped body, embracing upper and lower members which are separated most widely at their central portions and the ends of which terminate in sleeves, the intermediate portions of said upper and lower members being joined by integral members constituting the two side walls of a gear housing, said side walls being provided with openings, and tubular members fitting tightly at their inner ends in said openings of the side walls and fitting tightly at their outer ends in said sleeves, the upper and lower members of the diamond shaped body being laterally flanged to laterally stiffen the body.

In testimony, that I claim the foregoing as my invention I affix my signature in the presence of two witnesses, this 27th day of May A. D. 1913.

THOMAS I. DUFFY.

Witnesses:
G. E. DOWLE,
W. L. HALL.